United States Patent [19]

Wanka et al.

[11] 3,850,232
[45] Nov. 26, 1974

[54] REACTOR COOLING SYSTEM WITH AN EVAPORATION TANK

[75] Inventors: Oskar Wanka, Deggendorg/Donau; Friedrich Gütlhuber, Metten; Hermann Graf, Hengersberg, all of Germany

[73] Assignee: Deggendorfer Werft und Eisenbau GmbH, Deggendorf/Donau, Germany

[22] Filed: Feb. 14, 1973

[21] Appl. No.: 332,492

[30] Foreign Application Priority Data
Feb. 16, 1972  Germany............................ 2207166

[52] U.S. Cl............... 165/107, 23/288 K, 23/288 L
[51] Int. Cl............................................ F28d 15/00
[58] Field of Search........ 165/107; 23/288 K, 288 L

[56] References Cited
UNITED STATES PATENTS

| | | | |
|---|---|---|---|
| 688,472 | 12/1901 | Knietsch | 23/288 K |
| 1,942,817 | 1/1934 | Jaeger | 23/288 L |
| 2,078,947 | 5/1937 | Houdry | 23/288 L |
| 2,148,670 | 2/1939 | Aicher | 23/288 L |
| 2,287,047 | 6/1942 | Mekler | 23/288 L |
| 2,309,996 | 2/1943 | Thayer | 23/288 L |
| 3,434,807 | 3/1969 | Ibing | 165/107 |
| 3,498,880 | 3/1970 | Gollion | 165/107 |
| 3,566,961 | 3/1971 | Lorenz | 165/107 |
| 3,595,308 | 7/1971 | Durdin | 165/107 |
| 3,624,759 | 11/1971 | Carlson | 165/107 |

FOREIGN PATENTS OR APPLICATIONS
607,511  12/1925  France................................ 165/107

*Primary Examiner*—Manuel A. Antonakas
*Assistant Examiner*—Daniel J. O'Connor
*Attorney, Agent, or Firm*—McGlew and Tuttle

[57] ABSTRACT

A reactor cooling system for cooling a reactor having an inlet and a discharge for the heat carrier comprises a pump housing which is arranged alongside of a cooler housing and is connected in parallel to the reactor and the cooler housing. An expansion tank for the heat carrier is mounted above and communicates with the pump housing and it also extends over the top of the cooler and surrounds a separator for the coolant which is mounted above the cooler housing. The cooler housing has a lower coolant chamber and contains coolant pipes which are connected between the coolant chamber and the separator and coolant is added through a coolant supply line connected through the separator and down to the coolant chamber. The coolant is added to maintain a predetermined level in the separator and the separator includes a vapor outlet for the discharge of accumulated vapor. A throttle valve is disposed between the connection of the cooler to the pump housing in order to vary the quantity of heat carrier which is circulated through the cooler.

11 Claims, 4 Drawing Figures

3,850,232

REACTOR COOLING SYSTEM WITH AN EVAPORATION TANK

BACKGROUND OF THE INVENTION

1. Field of the Invention

This invention relates in general to the construction of reactors and, in particular, to a new and useful reactor cooling system which includes an expansion tank for the heat carrier which communicates with a pump housing which is connected in parallel between the reactor and the cooler housing.

2. Description of the Prior Art

In the known reaction devices for carrying out exothermic chemical processes, the heat which is released in the reaction of a gas with a catalyst mass which is arranged in a plurality of contact pipes in the known tube type reactors, is eliminated by means of a liquid heat carrier, for example, a fused salt which is circulated around the contact tubes. This heat carrier surrounding the tubes is usually circulated by a pump and after it absorbs heat it is conducted through a cooler in order that it may be reused at its initial temperature. Various constructions of these reaction devices are known. In one type the cooler and the circulation pump are placed in separate housings which are mounted outside of the reaction vessel. In another arrangement the circulation pump is mounted in the middle of the reaction vessel, i.e., in the central part thereof which is clear of contact pipes and where either the whole or a partial backflow of the heat carrier takes place. In this latter case the cooler is mounted either coaxially with the circulation pump or is also mounted outside the reaction vessel. In the latter case only a part of the heat carrier passes through the reaction vessel. The first mentioned system shows a disadvantage in that the evaporation and superheating of the used coolant which in general comprises water, takes place in a nest of pipes. In places where water is transformed into vapor high thermic strains which act alternately are produced in the material and this often leads to tension cracks. With the second system mentioned above, there is a disadvantage in respect to the changing of the catalyst which requires that the circulation pump be dismounted. In this system the cooler is submerged and a vapor separator must be provided at a spacing thereabove. For cooling capacities of about 5 × 10⁶ calories/hour and more, a relatively large piping is needed to connect the cooler with the vapor separator. Moreover, in both of the systems mentioned above, when the operation temperature is changed the heat carrier must be drained off or refilled because there is insufficient space for its expansion.

SUMMARY OF THE INVENTION

In order to remedy the drawbacks of the prior art the invention provides a construction in which the circulation pump and the cooler are arranged in two separate houses in side by side relationship with the cooler housing being connected in parallel to the reaction vessel for the circulation of the heat carrier. In addition, an expansion tank for the heat carrier is mounted above and communicates with the pump housing and a vapor separator for the coolant is mountd directly above the cooler housing and communicates with the coolant circulation pipes which extend through the cooler housing. In the preferred arrangement the expansion tank is arranged to extend both above the pump housing and the cooler housing and to surround the vapor separator. the expansion tank advantageously is provided with a burst plate as a cover or as a portion of the cover.

Preferably a control member or throttle is provided in the connection between the pump housing and the cooler housing in order to vary the quantity of heat carrier hich is circulated through the cooler. In addition heating means are provided in the pump housing to permit heating up of the reaction apparatus particularly at the start of the operation in order to maintain the operational temperatures during temporary interruptions of the reaction process.

Accordingly it is an object of the invention to provide an improved reactor cooling system which includes a pump housing and cooler housing arranged outside of the reactor and connected to the reactor in parallel and with an expansion tank for the heat carrier which is to be circulated through the reactor mounted above the pump housing and in communication with the pump housing and preferably surrounding a separator for the coolant which is mounted over the coolant housing.

A further object of the invention is to provide a reactor coolant cooling system which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENT

Figure 1:
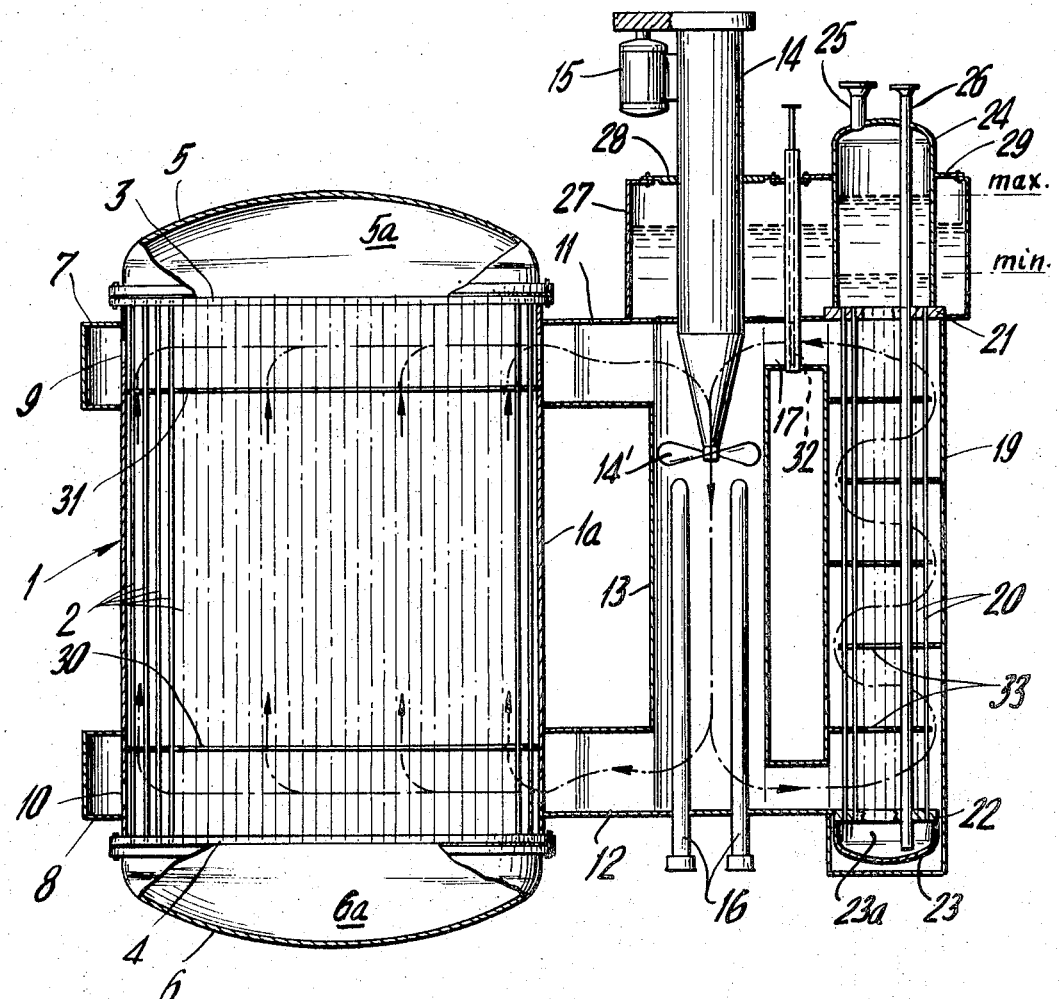
FIG. 1 is a staggered line sectional view of a reactor constructed in accordance with the invention and taken along the line a, b, c shown in FIG. 2.
Figure 2:
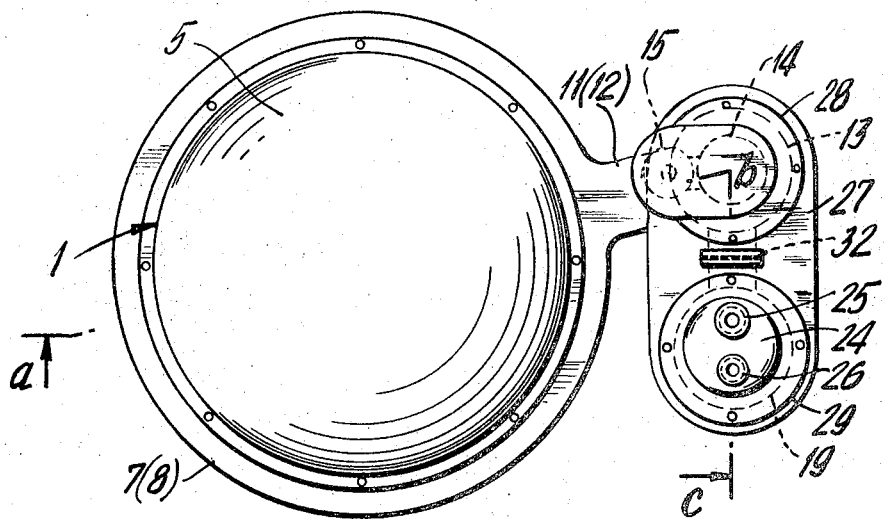
FIG. 2 is a top plan view of the reactor cooling system shown in FIG. 1.

Referring to the drawings in particular the invention embodied therein as shown in FIGS. 1 and 2 comprises a reaction vessel 1 having an outer cylindrical wall portion 1a and which contains a plurality of vertically arranged contact pipes or tubes 2 which extend between and are secured into respective top and bottom tube sheets 3 and 4. The tube sheets are enclosed by a dome-shaped top 5 and bottom 6 respectively flanged to the associated tube sheets 3 and 4. Annular top and bottom conduits 7 and 8 are disposed in respective spaced relationship to top tube sheet 3 and bottom tube sheet 4 and they communicate with the interior space within the wall 1a through apertures 9 and 10 respectively which are distributed around the circumference. Both of the annular conduits 7 and 8 communicate through top and bottom tube connections 11 and 12 with the inlet and discharge respectively of a pump housing 13 which is mounted alongside the reaction vessel 1. A pump unit 14 is carried within the pump housing 13 and it includes an impeller 14' which is driven by a pump motor 15. Means for heating the heat carrier in the form of a plurality of hollow bars 16 extend into the pump housing from the bottom end thereof. The pump housing 13 includes an additional inlet connection 17 and a discharge connection 18 which are connected to the inlet and discharge respectively over a cooler housing 19. The cooler housing 19 carries a plurality of cooling pipes 20 which are tightly connected to a top and a bottom tube plate 21 and 22 respectively for the circulation of a coolant from a bottom chambers 23a of a cap 23 to a vapor separator 24 arranged at the top of the cooler and within an expansion tank 27 which is arranged to extend above the top of the cooler 19 and the pump housing 13. The separator 24 covers the top tube plate 21 and it is provided with a vapor outlet connection 25 and a coolant supply pipe 26 which extends through the vapor separator 24 and the cooling housing 19 and into the chamber 23a. The expansion tank 27 communicates to the pump housing 13 and it has a burst plate 29 which forms a part of its cover 28.

In operation of the reaction apparatus a reaction gas is directed between chambers 5a and 6a through contact pipes 2 which contain a catalyst mass. The heat which is generated by the passage of the gas through the catalyst mass is eliminated in known manner by a heat carrier, for example, a fused salt which is circulated by a pump such as the pump 14. With the inventive arrangement the circulation is effected in the direction of the arrows, i.e., a heat carrier flows through the discharge connection 12 through the bottom annular conduit 8 and enters reaction vessel 1 radially from all sides and moves first transversely over the contact pipes 2. The heat carrier is then distributed over the whole section by means of an appropriately shaped perforated plate 30 to cause flow axially along the contact pipes 2. At the upper end of the reactor 1 a second perforated plate 31 permits upward and then transverse flow of the heat carrier into the tube connection 11 to the suction connection of the pump housing 13. The rotation of the pump impeller 14' causes the heat carrier to be moved downwardly in the pump housing 13 for recirculation through the tube connection 12 into the annular conduit 8.

In a second circuit the heat carrier flows from the pump housing 13 through another discharge namely through the connection tube 18 to the cooler housing 19 and returns through the upper tube connection 17 to the inlet of the pump. A throttle slide valve is provided between the cooler 19 and the pump 13 for regulating the flow through the cooler and thus the partial circulation of the heat carrier through the cooler housing may be controlled. In order to obtain a more intensive cooling the partial stream of heat carrier is moved along the cooling pipes 20 in a tortuous path around alternately arranged vertically spaced baffle plates 33.

In this reactor cooling system, one of the partial streams of the heat carrier is cooled down from a temperature from which it enters into the reaction vessel 1 to a temperature which is as much lower than the reaction vessel after the remixing of the two partial streams, i.e., the one coming from the reaction vessel and the other coming from the cooler housing, so that the desired recirculation temperature is achieved again. The volume of the expansion tank 27 is dimensioned so as to assure that in the desired range of operational temperatures, the pump housing and the cooler housing 19 will always be filled with heat carrier and any overflow will be prevented at increased temperatures.

In order to avoid the presence of evaporation zones in the cooling pipes 20, only as much cooling water as is necessary to keep the level of the cooling water between the maximum and minimum markings indicated will be added through the cooling supply conduit 26. The vapor which bubbles up through the water accumulates above the water level and can be evacuated through the vapor outlet 25.

The heating means 16 provided in the pump housing 13 is needed from time to time usually during or after an interruption of the reaction process and it is provided in order to heat up the carrier within the reaction vessel 1 so as to maintain the necessary operational temperature. During this time the other circulation through the cooler housing 19 is stopped by means of the slide valve 32.

Figure 3:
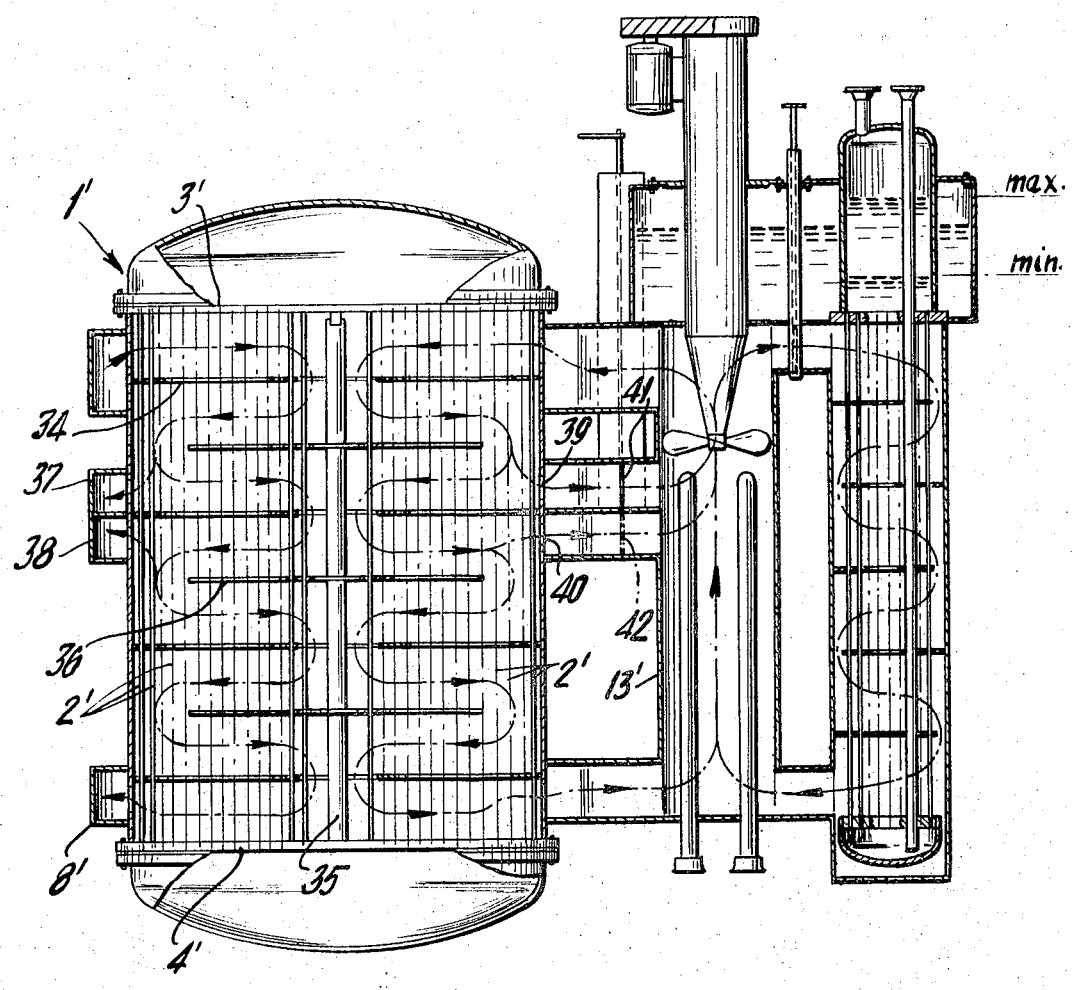
FIG. 3 is a view similar to FIG. 1 of another embodiment of reactor cooling system.
Figure 4:
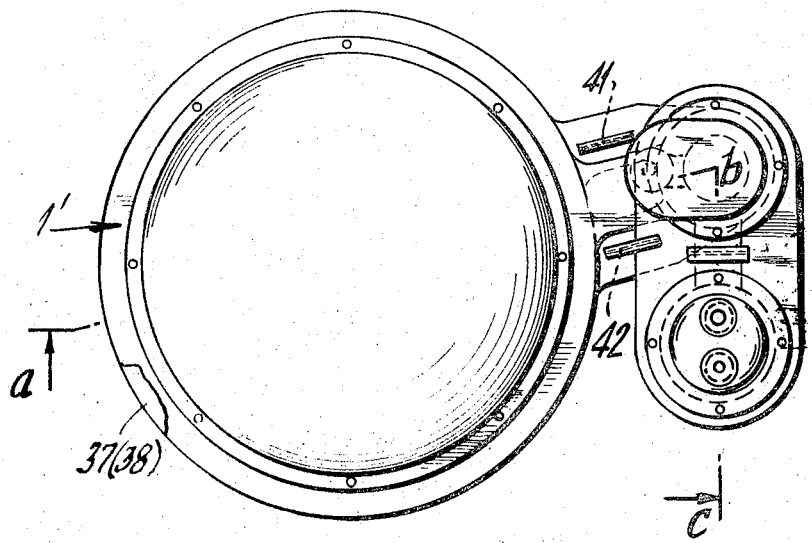
FIG. 4 is a top plan view of the embodiment shown in FIG. 3.

In the embodiments shown in FIGS. 3 and 4, the parts which are similar to the embodiment of FIGS. 1 and 2 are not designated but the distinct or different parts are designated by reference nuemrals. As in the other embodiment, a pump housing and a cooler housing are arranged outside of the reaction vessel in side by side location and they are connected together to provide for parallel flow from the pump housing to the reactor into the cooler. The circulation is as indicated by the arrows and in this arrangement the circulation of the heat carrier is inverted, i.e., the heat carrier circulates in the pump housing from the bottom to the top and in the reaction vessel from the top to the bottom. In addition, the contact pipes designated 2' are arranged in an annular nesting between two plates 3' and 4'. The heat carrier is guided by alternate annular baffle plates 34 which are arranged adjacent the outer wall of the vessel and circular baffles 36 of smaller diameter which are mounted on a central tube 35. In this manner the heat carrier moves alternately, outwardly and inwardly over the tubes.

Another variation which is shown in FIGS. 3 and 4 is that additional conduits 37 and 38 an the reaction vessel 1' are provided for the return flow of the heat carrier through circumferentially spaced openinss 39 and 40. By these additional conduits controllable partial quantities of the heat carrier may be reconducted before reaching the bottom annular conduit 8', from the reaction vessel through passages regulated by the throttle portions 41 and 42 back into the pump housing 13'. This possibility is useful mainly in such nonuniform reaction processes where a relatively great part of the heat quantity is released in the first longitudinal portions of the contact pipes 2'.

While specific embodiments of the invention have been shown and described in detail to illustrate the application of the principles of the invention, it will be understood that the invention may be embodied otherwise without departing from such principles.

What is claimed is:

1. A reactor cooling system comprising a reactor vessel having a heat carrier inlet and a heat carrier discharge spaced from said heat carrier inlet, a pump housing having a pump housibg inlet connected to said heat carrier discharge and a pump housing outlet connected to the said heat carrier inlet, a cooler housing adjacent said pump housing having a cooler housing inlet connected to said pump housing discharge and a cooler housing discharge connected to said pump housing inlet, said reactor vessel, said pump housing and said cooler being substantially cylindrical and coextensive in length and the connection of said cooler housing to said pump housing being in parallel to the connection of said reactor vessel to said pump housing with corresponding interconnected inlets and outlets of said reactor vessel, said pump housing and said cooler being at substantially the same levels, an expansion tank having a liquid heat carrier mounted directly on top of and communicating with said pump housing and said cooler and maintaining a liquid heat carrier level in said tank above the level of said pump housing, a separator for the coolant mounted directly on top of said cooler housing and having a liquid coolant therein at a top level above said cooler housing, said cooler housing having a lower coolant chamber and coolant pipes connected between said coolant chamber and said separator, said cooler housing having a heat carrier passage around said coolant pipes, and a cooler housing inlet and cooler housing discharge connected to said pump housing for the flow of the heat carrier therethrough to said pump housing.

2. A reactor cooling system according to claim 1, wherein said expansion tank is large enough to extend over said pump housing and said cooler housing and wherein it surrounds said separator.

3. A reactor cooling system according to claim 1, wherein the connection of said pump housing to said cooler housing includes a passage separator from the connection to said reactor to said cooler for both said inlet and said discharge.

4. A reactor cooling system according to claim 1, including heating means for heating the heat carrier.

5. A reactor cooling system according to claim 1, including valve means in the connection between said cooler and said pump housing for regulating the flow of heat carrier therebetween.

6. A reactor cooling system according to claim 2, including a cover for said expansion tank surrounding said separator having a pressure operable burst plate portion.

7. A reactor cooling system, comprising a reactor having a tubular housing with a tube sheet spaced from each end and defining a chamber at each end of said housing, between the ends of said housing and the respective tube sheets, a plurality of tubes having a catalyst therein and extending through said housing into a respective tube sheet at each end and located between said end chambers, at least one first annular passage surrounding said housing adjacent each end of said tubes opening into the interior of said housing around said tubes, a pump housing having an inlet and a discharge connected to respective ones of said annular conduits, a cooler housing having an inlet and a discharge connected to said pump housing, said cooler housing including a plurality of tubes extending therethrough for the circulation of a cooling liquid, a vapor separator mounted on the top of said cooler and connected to the tops of said tubes and having a liquid level therein above said tubes, and an expansion tank for the heat carrier and mounted on the top of said pump housing and communicating with said pump housing and having a liquid coolant level above the level of said pump housing, said pump housing and said cooler housing being tubular and substantially the same length as said reactor tubular housing with corresponding interconnected annular conduits inlets and discharges being of substantially the same level, and a pump extending through said expansion tank and into the top of said pump housing having a rotor in said pump housing.

8. A reactor, according to claim 7, wherein said inlet of said pump housing includes one passage extending to said annular conduit of said reactor and a separate passage extending to said cooler housing, said pump inlet including a first passage connected to said annular conduit of said reactor and another passage connected to said cooler housing.

9. A reactor cooling system, according to claim 8, including and means between said cooler housing and said pump housing for throttling the flow of the heat carrier therebetween.

10. A reactor cooling system according to claim 7, including two additional annular conduits located around said reactor adjacent the central portion thereof, each having a valve connection to said pump for the return of the neat carrier from the reactor before it travels the full length thereof.

11. A reactor according to claim 10, wherein the interior of said reactor is provided with an annular nesting of tubes which extend along the length thereof and including baffle means for promoting a tortuous back and forth radial and axially progressing flow.

* * * * *